United States Patent
Pierenkemper et al.

(10) Patent No.: US 6,765,393 B2
(45) Date of Patent: Jul. 20, 2004

(54) METHOD AND AN APPARATUS FOR DETERMINING DISTANCE

(75) Inventors: Hans-Werner Pierenkemper, Emmendingen (DE); Sebastian Pastor, Freiburg (DE)

(73) Assignee: Sick, AG (DE)

( * ) Notice: Subject to any disclaimer, the term of this patent is extended or adjusted under 35 U.S.C. 154(b) by 0 days.

(21) Appl. No.: 10/158,557

(22) Filed: May 29, 2002

(65) Prior Publication Data

US 2003/0020491 A1 Jan. 30, 2003

(30) Foreign Application Priority Data

May 29, 2001 (DE) .......................................... 101 26 087

(51) Int. Cl.[7] .............................................. G01R 27/04
(52) U.S. Cl. ...................................................... 324/635
(58) Field of Search ................................ 324/652, 675, 324/668, 682, 635, 633, 637, 634, 639; 235/462.01

(56) References Cited

U.S. PATENT DOCUMENTS 5,309,212 A    5/1994  Clark
5,874,719 A *  2/1999  Hippenmeyer et al. ..... 235/462
6,193,157 B1 * 2/2001  Dickson et al. ......... 235/462.01

FOREIGN PATENT DOCUMENTS

DE    195 20 993 A1   12/1996
EP    0 434 191 A2     6/1991
EP       0747727 A2    4/1996

* cited by examiner

*Primary Examiner*—N. Le
*Assistant Examiner*—Amy He
(74) *Attorney, Agent, or Firm*—Townsend and Townsend and Crew, LLP

(57) ABSTRACT

Techniques for determining the distance between a measuring apparatus and an object are provided. The measuring apparatus includes a transmitter, a receiver and a filter module having a defined phase frequency characteristic, in which a modulated signal, in particular a light signal, is transmitted in the direction of the object by the transmitter, the signal reflected by the object is received by the receiver and the output signal of the receiver is delivered to the transmitter at least via the filter module, wherein at least the transmitter, the receiver and the filter module form a resonant circuit, the frequency of resonance of the resonant circuit is measured and the distance is determined from the frequency of resonance. The respective frequency of resonance of the resonant circuit is determined for at least two different phase frequency characteristics.

34 Claims, 3 Drawing Sheets

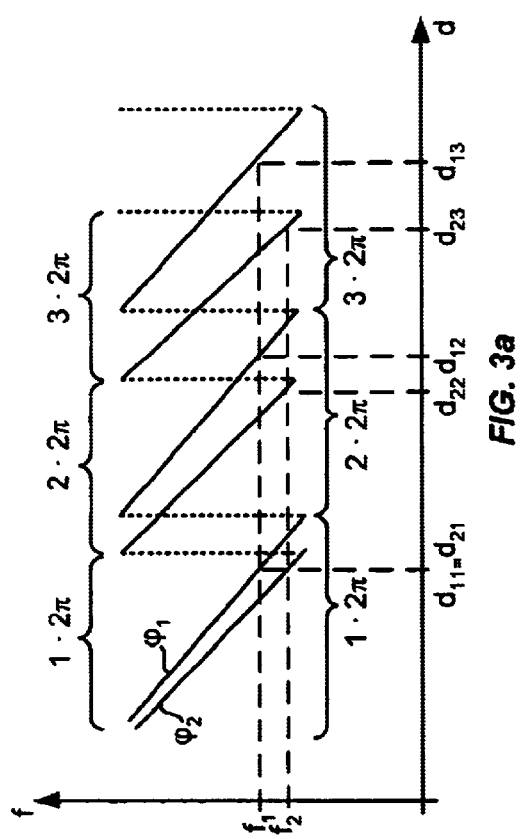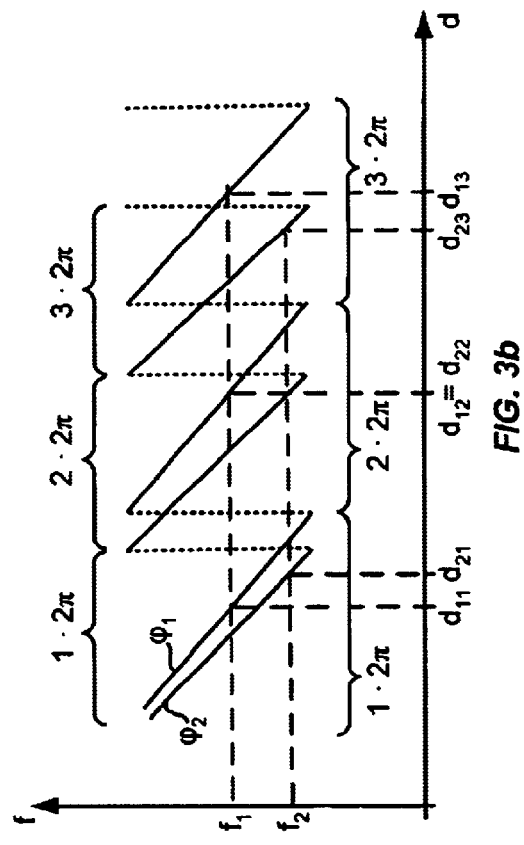

METHOD AND AN APPARATUS FOR DETERMINING DISTANCE

BACKGROUND OF THE INVENTION

The invention relates to a method and to a device for determining the distance to an object.

In this connection, the measuring principle of the stimulation and evaluation of a sympathetic vibration is used: a transmitter transmits a modulated signal, in particular a modulated light signal, along a measured length in the direction of the object. The signal reflected by the object along the measured length or along a part thereof is detected by a receiver and delivered—directly or via further components—to a filter module with defined phase frequency characteristics. The output signal of the filter module is in turn delivered—directly or indirectly—to the transmitter.

A resonant circuit is formed in this manner by the transmitter, by the measured length, by the receiver, by the filter component and, optionally, by further components. The transmitter is integrated in this resonant circuit such that its modulation frequency corresponds to the frequency of resonance of the resonant circuit dependent on the signal transit time over the measured length. The sought distance to the object can thus be calculated by a measurement of the frequency of resonance of the resonant circuit. The prerequisite for the functioning of this measurement principle is the use of a filter module whose phase response for the desired measurement range ensures the occurrence of a resonant condition, that is, the production of a phase shift of a total of $2\pi$ or of $360°$ or of an integral multiple thereof.

SUMMARY OF THE INVENTION

It is an underlying object of the invention to increase the accuracy of the distance determination for this known measurement principle.

Embodiments of the present invention provide a plurality of phase frequency characteristics, which differ with respect to phase and amount, used to form the resonant circuit and to determine the corresponding frequency of resonance. A comparison value is available by this taking into account of at least one further phase frequency characteristic which can be used in the manner explained in the following to check the determined distance and/or to increase the measurement accuracy.

The frequencies of resonance determined for the different phase frequency characteristics are preferably taken into account for the determination of the sought distance. For this purpose, the different frequencies of resonance—or the respective distances corresponding to these frequencies of resonance—are put in relation to one another. It is in any case important for the results of a plurality of measurements of the frequency of resonance for different phase frequency characteristics to be not further processed independently of one another, but to be combined with one another for the evaluation.

The evaluation of the measured frequencies of resonance is therefore not restricted to the purpose of an exclusive and direct distance determination. The frequencies of resonance determined for the different phase frequency characteristics can in particular be additionally used for an non-ambiguity check, i.e. for a check as to which of the possible resonant conditions is present. The phase information to be evaluated namely repeats for different scanning distances with a certain periodicity. With the known measurement principle, this can result in an incorrect determination of the sought distance under unfavorable conditions, that is, when the correct resonant condition was not used as the basis for the evaluation of the measured frequency of resonance.

In contrast to this, a check can be made in embodiments of the invention due to the taking into account of different phase frequency characteristics as to which integral multiple of $2\pi$ or of $360°$ is present. An extension of the range of non-ambiguity is thereby achieved.

A possible procedure for this non-ambiguity check comprises comparing the frequencies of resonance determined for the different phase frequency characteristics with one another or with at least one reference value, or of determining and comparing with one another a plurality of different phase frequency characteristics and in particular also distances corresponding to different resonant conditions. It is of advantage for such a comparison evaluation if the underlying distance of the object is unchanged or if any change in distance in the meantime is known and taken into account as well.

Alternatively or in addition to this non-ambiguity check, the measurement accuracy can be increased in that the different phase frequency characteristics, or the frequencies of resonance determined from these, are used to determine the parasitic phase shift, that is, that phase shift which is caused by components other than by the filter component explained.

As already explained, the resonant circuit can include further components, for example an amplifier, a band pass filter or a phase correction circuit. These components can change their contribution to the phase shift along the resonant circuit, for example due to temperature effects or aging effects, in a manner which cannot be predicted with sufficient accuracy by one-time reference measurements. Inaccuracies in the distance determination result if the portion of the measured phase shift which is due to the signal development along the actual measured length is no longer trackable.

To compensate for such errors and for further systematic errors, the plurality of frequencies of resonance corresponding to the different phase frequency characteristics can be used to determine the parasitic phase shift. This determination of the parasitic phase shift can take place individually for each distance measurement or the result can be compared with earlier results. To obtain the highest possible accuracy here, the distance of the object should remain as unchanged as possible, or any possibly known change in distance should also be taken into account, during the measurement of the different frequencies of resonance.

At least the different phase frequency characteristics, which correspond to the determined frequencies of resonance, and a suitable resonant condition can be taken into account for the explained determination of the parasitic phase shift.

An evaluation unit can be provided within the apparatus for the carrying out of the explained non-ambiguity check and/or for the explained determination of the parasitic phase shift.

The different phase frequency characteristics can differ with respect to their respective center frequency and/or to their gradient in the region of their different or same center frequency. It is, however, preferred for the transmission areas corresponding to the different phase frequency characteristics and respectively restricted by the 3 dB limit frequencies to overlap.

It is furthermore preferred if the phase shift caused by the phase frequency characteristic of the filter component dominates over the parasitic phase shift in the area of frequency of resonance of interest for the distance determination, in particular with the center frequency. The phase shift effected by the filter component can in particular be at least one and a half times larger than or twice as large as the parasitic phase shift.

It is furthermore of advantage if at least one phase frequency characteristic used for the determination of the distance is selected such that the corresponding frequency of resonance lies in a frequency range within which the frequency of resonance can be determined with particularly high measurement accuracy. The further frequencies of resonance can be selected such that the further evaluations, for example the non-ambiguity check or the determination of the parasitic phase shift, can take place particularly simply or with a particularly high accuracy.

As explained, it is of advantage if the different frequencies of resonance are determined for the respective same distance of the object. It is preferred for this purpose if the frequencies of resonance of the resonant circuit are determined simultaneously or at least at short time intervals to one another.

The constructional effort to realize the invention can be advantageously reduced in that a single filter module is provided with which the different phase reference characteristics can be selected. As an alternative to this, a separate filter module can be provided for each phase reference characteristic.

It is furthermore of advantage if a plurality of components are used commonly to form the different resonant circuits with the different frequencies of resonance. In particular the transmitter and the receiver are suitable for this in addition to the already mentioned filter module. In this way, the resonant circuits can therefore be designed parallel in part. The respectively individually provided part of the resonant circuits can be separated from the parallel part by a sum member or by a decoupler.

In accordance with an embodiment of the present invention, a filter module is made as a digital module. The phase reference characteristic of this filter module is thereby defined particularly accurately and reproducibly. Moreover, unwanted temperature effects and aging effects are excluded to a very large extent. Furthermore, with such a digital design, a plurality of different phase reference characteristics can be realized in a particularly simple and space-saving manner such that a partly parallel design of a plurality of resonant circuits is promoted.

It is preferred for a plurality, in particular all components of the apparatus, which form part of the resonant circuit and cause a phase shift, to be realized inside the digital module. A band pass filter and/or a phase correction circuit are in particular suitable for this additional integration.

Furthermore, this digital module can be made by an FPGA (field programmable gate array) or by a GA (gate array).

It must moreover be noted that the different embodiments of this further solution approach can be combined in any desired way with the solution approach first mentioned of the plurality of phase reference characteristics.

Embodiments of the invention can be used to particular advantage with respect to all solution approaches and embodiments for the determination of the object distance for the purpose of an automatic focusing of the optical transmission system and/or of the optical reception system of a barcode reader, since the accuracy of the distance determination is particularly important in a barcode reader with an autofocus function.

The invention will be explained in the following by way of example with reference to the drawings.

BRIEF DESCRIPTION OF THE DRAWINGS

FIGS. 3a and 3b depict distance frequency diagrams.

DESCRIPTION OF THE PREFERRED EMBODIMENTS

Figure 1:
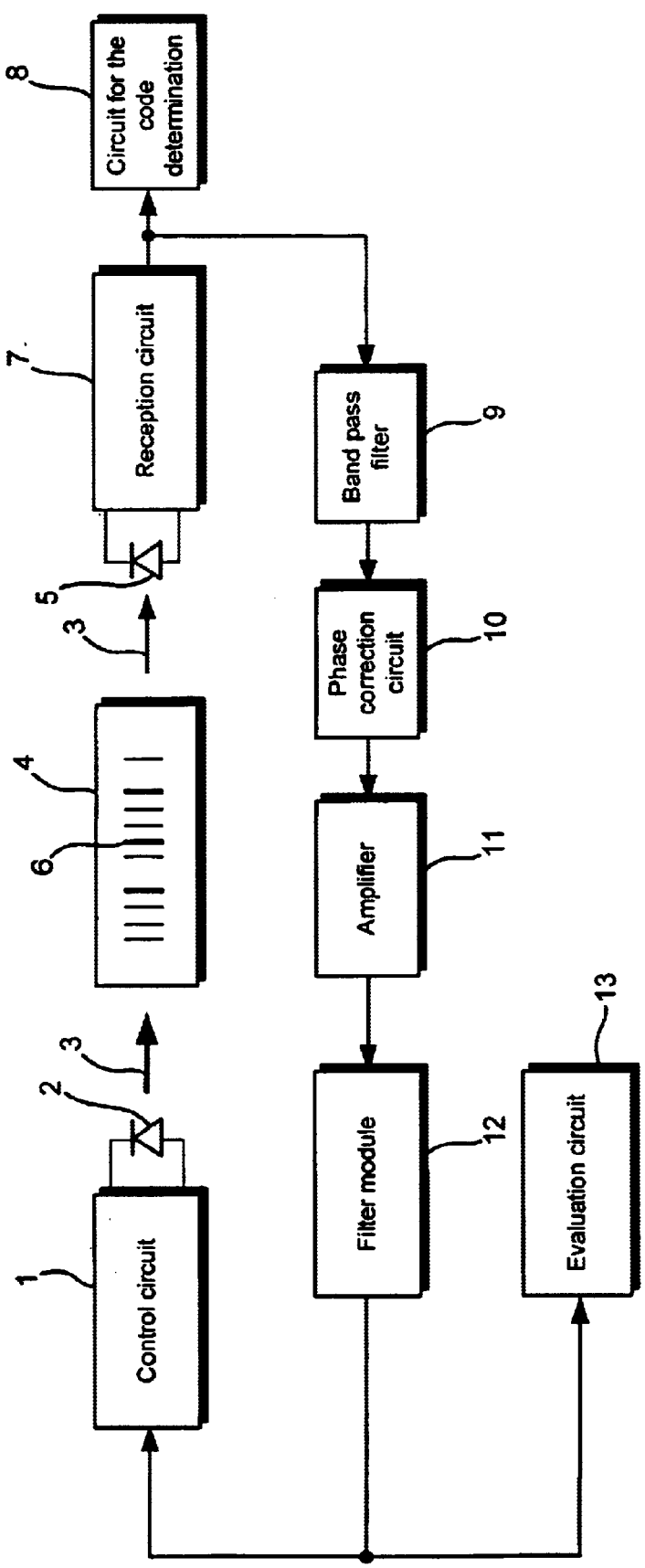
FIG. 1 depicts a block diagram of an apparatus in accordance with the invention which is part of a code reader.

The apparatus shown in FIG. 1 has a transmitter 2, in particular a laser diode, which is loaded by a control circuit 1 and which transmits a modulated light ray over a measured length 3. This light ray is reflected by an object 4 arranged at the end of the measured length 3 and in this manner arrives at a receiver 5, in particular at a light receiver, via the measured length 3. The object 4 is provided with a code 6 which is scanned by the light ray.

The signal produced by the receiver 5 is delivered to a reception circuit 7 whose output signal loads, on the one hand, a circuit 8 to determine the code 6 to be scanned and, on the other hand, a circuit comprising a plurality of components for determining the distance between the transmitter 2 and/or the receiver 5 and the object 4. A corresponding signal splitting can take place, for example, by the use of additional filters.

A band pass filter 9 for the extraction of the signal suitable for the distance determination is loaded with the output signal of the reception circuit 7. The signal supplied from this band pass filter 9 is delivered to a phase correction circuit 10 which is designed such that it compensates, at least in part, the phase shifting influence of the individual components of the total circuit so that the signal applied at the output of the phase correction circuit 10—with respect to the signal transmitted by the transmitter 2—ultimately substantially only has the phase shift caused by the light transit time over the measured length 3.

The output of the phase correction circuit 10 is connected to an amplifier 11 whose output signal loads a filter module 12. The output signal of the filter module 12 is delivered, on the one hand, to the control circuit 1 to control the transmitter 2 and, on the other hand, to an evaluation circuit 13.

The transmitter 2, the measured length 3, the receiver 5, the reception circuit 7, the band pass filter 9, the phase correction circuit 10, the amplifier 1, the filter module 12 and the control circuit 1 form a closed feedback system, that is, a resonant circuit in which different light transit times over the measured length 3 result in a phase change in the signal supplied by the receiver 5 and said phase change is converted into a frequency change.

The respectively resulting frequency of resonance of this resonant circuit can be measured directly by the evaluation circuit 13 to determine the distance of the object 4 from this. This distance information can be used, for example, for the automatic focusing of an optical reception system on the code 6.

In accordance with an embodiment of the invention, at least two different phase frequency characteristics can be used within the filter module 12. This has the result that the explained resonant circuit oscillates with different frequencies of resonance. The improvement in the measuring accuracy thereby made possible will be explained in the following with reference to FIG. 2.

Figure 2:
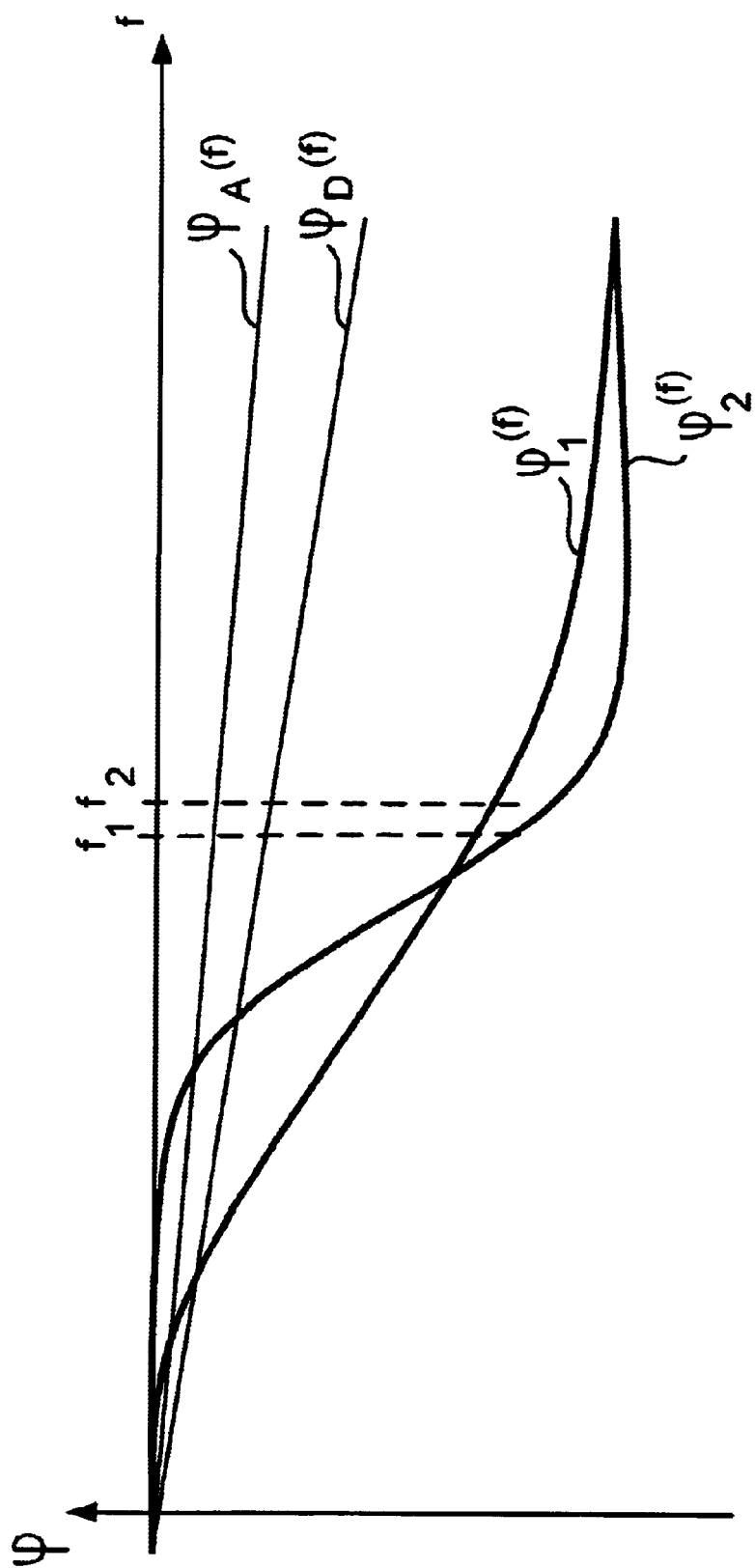
FIG. 2 depicts a frequency phase diagram.

FIG. 2 shows a diagram in which the phase φ is entered over the frequency f. Two different phase frequency characteristics $\phi_1$ and $\phi_2$, implemented in the filter module 12, are drawn therein.

In that these two different phase frequency characteristics $\phi_1$ and $\phi_2$ are used as the basis for the otherwise same resonant circuit in accordance with FIG. 1, i.e. in particular also for the same distance of the object 4 along the measured length 3, different frequencies of resonance are adopted. The frequencies of resonance $f_1$ and $f_2$ are drawn by way of example in FIG. 2. The distance between the measuring apparatus and the object 4 can be calculated from either of these two frequencies of resonance $f_1$ and $f_2$ due to the knowledge of the corresponding phase frequency characteristic $\phi_1$ and/or $\phi_2$.

The two frequencies of resonance $f_1$ and $f_2$, or the corresponding distances, can moreover be used for a non-ambiguity check, that is, for a check of which integral multiple of $2\pi$ or of $360°$ underlies the respectively measured frequency $f_1$ and $f_2$ as the resonant condition.

The distances corresponding to the measured frequencies of resonance $f_1$, $f_2$ are, for example, determined for this check, with—optionally—a plurality of different resonant conditions, that is, different integral multiples of $2\pi$ or of $360°$, being used as the respective base. A non-ambiguous result can be determined by a comparison of these different possible distances.

This procedure can be seen from FIG. 3a. The development of the frequency of resonance f is shown in this in dependence on the object distance d—in each case for the phase frequency characteristic $\phi$ and the phase frequency characteristic $\phi_2$—and indeed for different resonant conditions $1*2\pi(i=1, 2, 3, \ldots)$.

Possible different distance values $d_{11}$, $d_{12}$, $d_{13}$, etc. result accordingly from the measured frequency of resonance $f_1$. The same applies accordingly to the frequency of resonance $f_2$ (distance values $d_{21}$, $d_{22}$, $d_{23}$, etc.). The resonant condition underlying the measurement or the correct object distance results directly from a comparison of these possible distance values $d_{1i}$, $d_{2i}$.

In the example shown in FIG. 3a, the respective measurement of the two frequencies of resonance $f_1$, $f_2$ is based on the resonant condition $1*2\pi$. In contrast, FIG. 3b shows by way of example the case that an oscillation having the resonant conditions $2*2\pi$ is stimulated and measured.

Instead of the explained calculation of a plurality of possible distances and of the comparison of these distances with one another, the non-ambiguity check can, for example, also be carried out in a simple manner in that only the difference of the measured frequencies of resonance $f_1$, $f_2$ is compared with a reference table from which the corresponding object distance results in a non-ambiguous manner. Such a reference table can be prepared and used by a previous evaluation of the dependence of frequency/distance shown in FIGS. 3a and 3b.

As an alternative or in addition to the non-ambiguity check explained with reference to FIG. 2, the determination of the two different frequencies of resonance $f_1$ and $f_2$ and the knowledge of the underlying different phase frequency characteristics $\phi_1$ and $\phi_2$ can be used to determine—individually for each distance measurement—the parasitic phase shift which is caused by components 9, 10, 11 other than the filter module 12. The phase behavior and the phase errors of the components of the resonant circuit cannot always be determined or predicted with the desired accuracy.

For this purpose, a constant value or a, for example, linear frequency dependence can be set for the parasitic phase shift. The frequent case of a constant time delay caused by one of the components 9, 10, 11 can be reproduced in a particularly correct manner by the last-named approach. A linear frequency dependence can also be set for the phase shift caused by the course of the signal along the measured length 3.

The resonant condition, that is, the phase shift $2\pi$ or $360°$ corresponding to a wavelength, or an integral multiple thereof, is equated, for example—in accordance with the following formula—in each case for the two frequencies of resonance $f_1$ and $f_2$ with the sum of the parasitic phase shift, of the phase shift caused over the measured length 3 and of the phase shift effected by the filter module 12:

$$\phi_{1,total}(f_1) = \phi_A(f_1) + \phi_D(f_1) + \phi_1(f_1)$$

$$\phi_{2,total}(f_2) = \phi_A(f_2) + \phi_D(f_2) + \phi_2(f_2)$$

In this respect, $\phi_{1,total}$ and $\phi_{2,total}$ correspond to the known resonant condition.

$\phi_A$ corresponds to the—possibly temperature dependent—parasitic phase shift for which a linear frequency dependence is a pre-requisite: $\phi_A(f) = m*f$. This approximation is represented in FIG. 2 by a straight line with the gradient m.

The further addend $\phi_D$ represents the phase shift caused due to the course of the signal along the measured length 3. $\phi_D(f) = d*f$ applies to this, where the gradient d depends on the distance of the scan object. A corresponding straight line is likewise drawn in FIG. 2.

The third addend $\phi_1$ or $\phi_2$ corresponds to the known phase shift caused by the filter module 12.

The two equations thus form a system of equations with the two unknown variables m and d. By measuring the two frequencies of resonance $f_1$ and $f_2$ for the different phase frequency characteristics $\phi_1$ and $\phi_2$, not only the variable d (and thus the distance of the object 4) can therefore be determined, but also—and indeed for every single distance measurement—the variable m, i.e. the parasitic phase shift.

Generally, a system of equations of the nth order necessary for the required measuring accuracy can be solved by the use of a corresponding number n of phase frequency characteristics $\phi_1$.

If the measurements of the different frequencies of resonance take place simultaneously or successively at short intervals, it can be assumed—as is the case here—that the distance to the object 4 does not change in the meantime.

As can be seen from FIG. 2, in the example explained, the two phase frequency characteristics $\phi_1$ and $\phi_2$ are selected such that the corresponding frequencies of resonance $f_1$ and $f_2$ lie closely adjacent to one another. The frequencies of resonance $f_1$ and $f_2$ in particular differ by less than the bandwidth (3 dB limit frequencies) of one of the filters respectively having the phase frequency characteristics $\phi_1$ and $\phi_2$. Due to the similarity shown of the frequencies of resonance $f_1$ and $f_2$, the explained linear arrangement is a sufficiently good approximation for the frequency dependence of the parasitic phase shift $\phi_A$. Such a selection of the phase frequency characteristics $\phi_1$ and $\phi_2$ is, however, not necessary, in particular not for the non-ambiguity check.

It can further be seen from FIG. 2 that the phase shift caused by the phase frequency characteristics $\phi_1$ and $\phi_2$ in each case dominates over the parasitic phase shift so that the resonance behavior of the resonant circuit and the spatial resolution of the distance determination can be influenced in a particularly simple and effective manner by the course of the phase frequency characteristics $\phi_1$ and $\phi_2$.

In accordance with an embodiment of the invention, the filter module 12 is—alternatively or additionally—made as a digital module so that the course of the phase frequency characteristics $\phi_1$ and $\phi_2$ is known with high accuracy and is substantially not subject to any unwanted temperature effects or aging effects.

In deviation from FIG. 1, the band pass filter 9, the phase correction circuit 10 and/or the circuit 8 for the code determination can also be integrated in these digital components.

What is claimed is:

1. A method of determining the distance between an apparatus and an object, the apparatus comprising at least one transmitter, one receiver and one filter module having a defined phase frequency characteristic, wherein at least the transmitter, the receiver and the filter module form a resonant circuit, the method comprising:

transmitting a modulated signal in the direction of the object using the transmitter;

receiving the signal reflected by the object using the receiver; and delivering an output signal of the receiver to the transmitter at least via the filter module;

measuring frequencies of resonance of the resonant circuit, and determining the distance from the frequencies of resonance ($f_1$, $f_2$), wherein the respective frequencies of resonance of the resonant circuit are determined for at least two different phase frequency characteristics, wherein at least one of the frequencies of resonance determined for the different phase frequency characteristics are used to determine a parasitic phase shift which is caused by components of the apparatus other than the filter module.

2. A method in accordance with claim 1, wherein the different phase frequency characteristics, the corresponding determined frequencies of resonance and a resonant condition are taken into account to determine the distance and the parasitic phase shift.

3. A method in accordance with claim 1, further comprising equating a phase shift corresponding to a wavelength with the sum of a phase shift achieved over the measured length, of the phase shift effected by the filter module and of the parasitic phase shift.

4. A method in accordance with claim 1, further comprising setting a linear frequency dependence for the parasitic phase shift.

5. A method in accordance with claim 1, wherein in that the frequencies of resonance of the resonant circuit are determined simultaneously or successively at short time intervals for the different phase frequency characteristics of the filter module.

6. A method in accordance with claim 1 wherein a plurality of distances, corresponding in particular to different resonant conditions, are determined from the different frequencies of resonance that are determined and compared with one another for the non-ambiguity check.

7. An apparatus for determining the distance to an object, the apparatus comprising:

for transmitting a modulated signal in the direction of the object;

a receiver for receiving the signal reflected by the object;

a filter module having a defined phase frequency characteristic via which the output signal of the receiver can be delivered to the transmitter to form a resonant circuit; and an evaluation device by which frequencies of resonance of the resonant circuit can be measured, wherein at least two different phase frequency characteristics are provided to stimulate and to determine different frequencies of resonance, wherein the distance can be determined by the evaluation device from at least one of the frequencies of resonance corresponding to the different phase frequency characteristics.

8. An apparatus in accordance with claim 7, wherein the frequencies of resonance determined for the different phase frequency characteristics or the distances corresponding to these frequencies of resonance are put into relationship with one another to determine the distance.

9. An apparatus in accordance with claim 7, wherein one single filter module with the different phase frequency characteristics is provided.

10. An apparatus in accordance with claim 7, wherein at least the transmitter and the receiver are provided as jointly used components to form the resonant circuits with the different frequencies of resonance.

11. An apparatus in accordance with claim 7, wherein the apparatus is made as a barcode reader having a focusing device for the automatic focusing of an optical transmission system or of an optical reception system, with the focusing being controllable in dependence on the distance determined.

12. An apparatus in accordance with claim 7, wherein the different phase frequency characteristics differ with respect to their center frequency to their gradient in the region of their respective center frequency.

13. An apparatus in accordance with claim 7, wherein at least one of the different phase frequency characteristics is selected such that the phase shift caused by the filter module at the center frequency is larger than the parasitic phase shift.

14. An apparatus in accordance with claim 7, wherein the different phase frequency characteristics are selected such that the corresponding frequencies of resonance of the resonant circuit lie adjacent to one another, with the frequencies of resonance differing in particular by less than the bandwidth corresponding to one of the phase frequency characteristics.

15. An apparatus in accordance with claim 7, wherein at least one phase frequency characteristic used for the determination of the distance is selected such that the corresponding frequency of resonance lies in a range of high measuring accuracy.

16. An apparatus in accordance with claim 7, wherein the different phase frequency characteristics differ with respect to their center frequency or to their gradient in the region of their respective center frequency, wherein the different phase frequency characteristics have a common transmission range.

17. An apparatus for determining the distance to an object, the apparatus comprising a transmitter for transmitting a modulated signal, in particular a light signal, in the direction of the object;

a receiver for receiving the signal reflected by the object;

a filter module having a defined phase frequency characteristic via which the output signal of the receiver can be delivered to the transmitter to form a resonant circuit; and an evaluation device by which frequencies of resonance of the resonant circuit can be measured, wherein the filter module is made as a digital module, the filter module having at least two different phase frequency characteristics that are provided to stimulate and to determine different frequencies of resonance.

18. An apparatus in accordance with claim 17, wherein at least one further component, which forms part of the resonant circuit, is realized in the digital component.

19. An apparatus in accordance with claim 17, characterized in that the digital component is formed by an FPGA or a GA.

20. A method of determining the distance between an apparatus and an object, the apparatus comprising at least one transmitter, one receiver and one filter module having a defined phase frequency characteristic, wherein at least the transmitter, the receiver and the filter module form a resonant circuit, the method comprising:

transmitting a modulated signal in the direction of the object using the transmitter;

receiving the signal reflected by the object using the receiver; and delivering an output signal of the receiver to the transmitter at least via the filter module;

measuring frequencies of resonance of the resonant circuit, and determining the distance from the frequencies of resonance, wherein the respective frequencies of resonance of the resonant circuit are determined for at least two different phase frequency characteristics, wherein at least one of the frequencies of resonance determined for the different phase frequency characteristics are taken into account in the determination of the distance.

21. A method in accordance with claim 20, wherein the frequencies of resonance determined for the different phase frequencies characteristics, or the distances corresponding to these frequencies of resonance are put in relation to one another for the determination of the distance.

22. A method in accordance with claim 20, wherein in that the frequencies of resonance of the resonant circuit are determined simultaneously or successively at short time intervals for the different phase frequency characteristics of the filter module.

23. A method in accordance with claim 22, wherein the frequencies of resonance determined for the different phase frequency characteristics are compared with one another or with at least one reference value for the non-ambiguity check.

24. A method in accordance with claim 20, wherein the distance determined is used for an automatic focusing of a barcode reader.

25. A method in accordance with claim 20, wherein different phase frequency characteristics differ with respect to their center frequency in the region of their respective center frequency, wherein the different phase frequency characteristics have a common transmission range.

26. A method in accordance with claim 20, wherein at least one of the different phase frequency characteristics is selected such that the phase shift caused by the filter module at the center frequency is larger than the parasitic phase shift.

27. A method in accordance with claim 20, wherein the different phase frequency characteristics are selected such that the corresponding frequencies of resonance of the resonant circuit lie adjacent to one another, with the frequencies of resonance differing by less than the bandwidth corresponding to one of the phase frequency characteristics.

28. A method in accordance with claim 20, wherein at least one phase frequency characteristic used for the determination of the distance is selected such that the corresponding frequency of resonance lies in a range of high measuring accuracy.

29. A method in accordance with claim 20, wherein the different phase frequency characteristics differ with respect to their gradient in the region of their respective center frequency, wherein the different phase frequency characteristics have a common transmission range.

30. A method of determining the distance between an apparatus and an object, the apparatus comprising at least one transmitter, one receiver and one filter module having a defined phase frequency characteristic, wherein at least the transmitter, the receiver and the filter module form a resonant circuit, the method comprising:

transmitting a modulated signal in the direction of the object using the transmitter;

receiving the signal reflected by the object using the receiver; and delivering an output signal of the receiver to the transmitter at least via the filter module;

measuring frequencies of resonance of the resonant circuit, and determining the distance from the frequencies of resonance, wherein the respective frequencies of resonance of the resonant circuit are determined for at least two different phase frequency characteristics, wherein at least one of the resonance frequencies determined for the different phase frequency characteristics are used for a non-ambiguity check.

31. A method in accordance with claim 30, wherein the frequencies of resonance of the resonant circuit are determined simultaneously or successively at short time intervals for the different phase frequency characteristics of the filter module.

32. An apparatus for determining the distance to an object, the apparatus comprising:

a transmitter for transmitting a modulated signal in the direction of the object;

a receiver for receiving the signal reflected by the object;

a filter module having a defined phase frequency characteristic via which the output signal of the receiver can be delivered to the transmitter to form a resonant circuit; and an evaluation device by which frequencies of resonance of the resonant circuit can be measured, wherein at least two different phase frequency characteristics are provided to stimulate and to determine different frequencies of resonance, wherein the parasitic phase shift, which is caused by components of the apparatus other than the filter module, can be determined by the evaluation device from the frequencies of resonance determined for the different phase frequency characteristics.

33. An apparatus for determining the distance to an object, the apparatus comprising:

a transmitter for transmitting a modulated signal in the direction of the object;

a receiver for receiving the signal reflected by the object;

a filter module having a defined phase frequency characteristic via which the output signal of the receiver can be delivered to the transmitter to form a resonant circuit; and an evaluation device by which frequencies of resonance of the resonant circuit can be measured, wherein at least two different phase frequency characteristics are provided to stimulate and to determine different frequencies of resonance, wherein the frequencies of resonance determined for the different phase frequency characteristics are compared with one another or with at least one reference value by the evaluation unit for a non-ambiguity check.

34. An apparatus for determining the distance to an object, the apparatus comprising:

a transmitter for transmitting a modulated signal in the direction of the object;

a receiver for receiving the signal reflected by the object;

a filter module having a defined phase frequency characteristic via which the output signal of the receiver can be delivered to the transmitter to form a resonant circuit; and an evaluation device by which frequencies of resonance of the resonant circuit can be measured, wherein at least two different phase frequency characteristics are provided to stimulate and to determine different frequencies of resonance, wherein a plurality of distances, corresponding in particular to different resonant conditions, are determined from the different frequencies of resonance and compared with one another by the evaluation unit for a non-ambiguity check.

* * * * *